US009961121B2

(12) United States Patent
Zhang

(10) Patent No.: US 9,961,121 B2
(45) Date of Patent: May 1, 2018

(54) SYSTEM AND METHOD FOR MAKING AND MAINTAINING CONNECTIONS AND PROVIDING AND TRANSMITTING INFORMATION BETWEEN GOVERNMENTAL PERSONS OR CANDIDATES AND THE AUDIENCE

(71) Applicant: Dafan Zhang, East Lansdowne, PA (US)

(72) Inventor: Dafan Zhang, East Lansdowne, PA (US)

( * ) Notice: Subject to any disclaimer, the term of this patent is extended or adjusted under 35 U.S.C. 154(b) by 173 days.

(21) Appl. No.: 14/164,116

(22) Filed: Jan. 24, 2014

(65) Prior Publication Data

US 2015/0213135 A1    Jul. 30, 2015

(51) Int. Cl.
   *G06F 17/30* (2006.01)
   *H04L 29/06* (2006.01)
   *G06F 3/0484* (2013.01)
   *G06Q 50/26* (2012.01)

(52) U.S. Cl.
   CPC .......... *H04L 65/403* (2013.01); *G06F 3/0484* (2013.01); *G06Q 50/26* (2013.01)

(58) Field of Classification Search
   CPC .................................................. G06F 3/0484
   USPC ........................................................ 707/722
   See application file for complete search history.

(56) References Cited

U.S. PATENT DOCUMENTS

| | | | | |
|---|---|---|---|---|
| 6,311,211 B1* | 10/2001 | Shaw | ................... | G06Q 10/107 709/206 |
| 8,064,590 B2* | 11/2011 | Abhyanker | ............ | G06Q 10/10 379/242 |
| 8,478,636 B2* | 7/2013 | Jeffrey | ................... | G06Q 10/00 235/386 |
| 2001/0029463 A1* | 10/2001 | Fuller | .................. | G06Q 10/107 705/12 |
| 2004/0054589 A1* | 3/2004 | Nicholas | ................ | G06Q 30/02 705/14.52 |
| 2004/0167794 A1* | 8/2004 | Shostack | ................ | G06Q 30/02 709/204 |
| 2007/0067322 A1* | 3/2007 | Harrison, Jr. | .......... | G06Q 50/26 |
| 2009/0313094 A1* | 12/2009 | Singh | ..................... | G06Q 10/10 705/12 |

(Continued)

OTHER PUBLICATIONS

Sunita Sohrabji, Who's Your Candidate? ElectNext Knows, Feb. 22, 2012, India West, Inida.

(Continued)

*Primary Examiner* — Sheree Brown

(57) ABSTRACT

A system for making and maintaining connections and providing and transmitting information between governmental persons or candidates and the audience, comprising a processor connected to a network; a database connected to the processor; a governmental person user interface operable to interact with the processor and the database; an audience user interface operable to interact with the processor and the database; wherein the processor is able to obtain information associated with a governmental person from the governmental person user interface; obtain information associated with a governmental person from a third party source; obtain information associated with an audience user; store the information obtained in the database.

16 Claims, 8 Drawing Sheets

(56) References Cited

U.S. PATENT DOCUMENTS

| | | | | |
|---|---|---|---|---|
| 2010/0064246 A1* | 3/2010 | Gluck | ............... | G06Q 50/26 |
| | | | | 715/779 |
| 2010/0145765 A1* | 6/2010 | Kantarek | ............... | G06Q 30/02 |
| | | | | 705/7.32 |
| 2010/0325179 A1* | 12/2010 | Tranter | ............... | G06Q 30/02 |
| | | | | 707/821 |
| 2012/0036080 A1* | 2/2012 | Singer | ............... | G06Q 10/10 |
| | | | | 705/319 |
| 2012/0233253 A1* | 9/2012 | Ricci | ............... | G06Q 50/01 |
| | | | | 709/204 |
| 2013/0042186 A1* | 2/2013 | Tranchina | ............... | G06Q 10/10 |
| | | | | 715/753 |
| 2014/0067970 A1* | 3/2014 | Sharma | ............... | G06Q 10/103 |
| | | | | 709/206 |
| 2014/0181192 A1* | 6/2014 | Sankar | ............... | H04L 67/22 |
| | | | | 709/204 |

OTHER PUBLICATIONS

Richard R. Lau & David P. Redlawsk, How Voters Decide: Information Processing during Election Campaigns, 2006, Cambridge University Press, New York.
Jennifer Stromer-Galley, On-Line Interaction and Why Candidates Avoid It, 2000, Journal of Communication, United States.
Project Vote Smart, www.votesmart.org, 1992-2014, United States.

\* cited by examiner

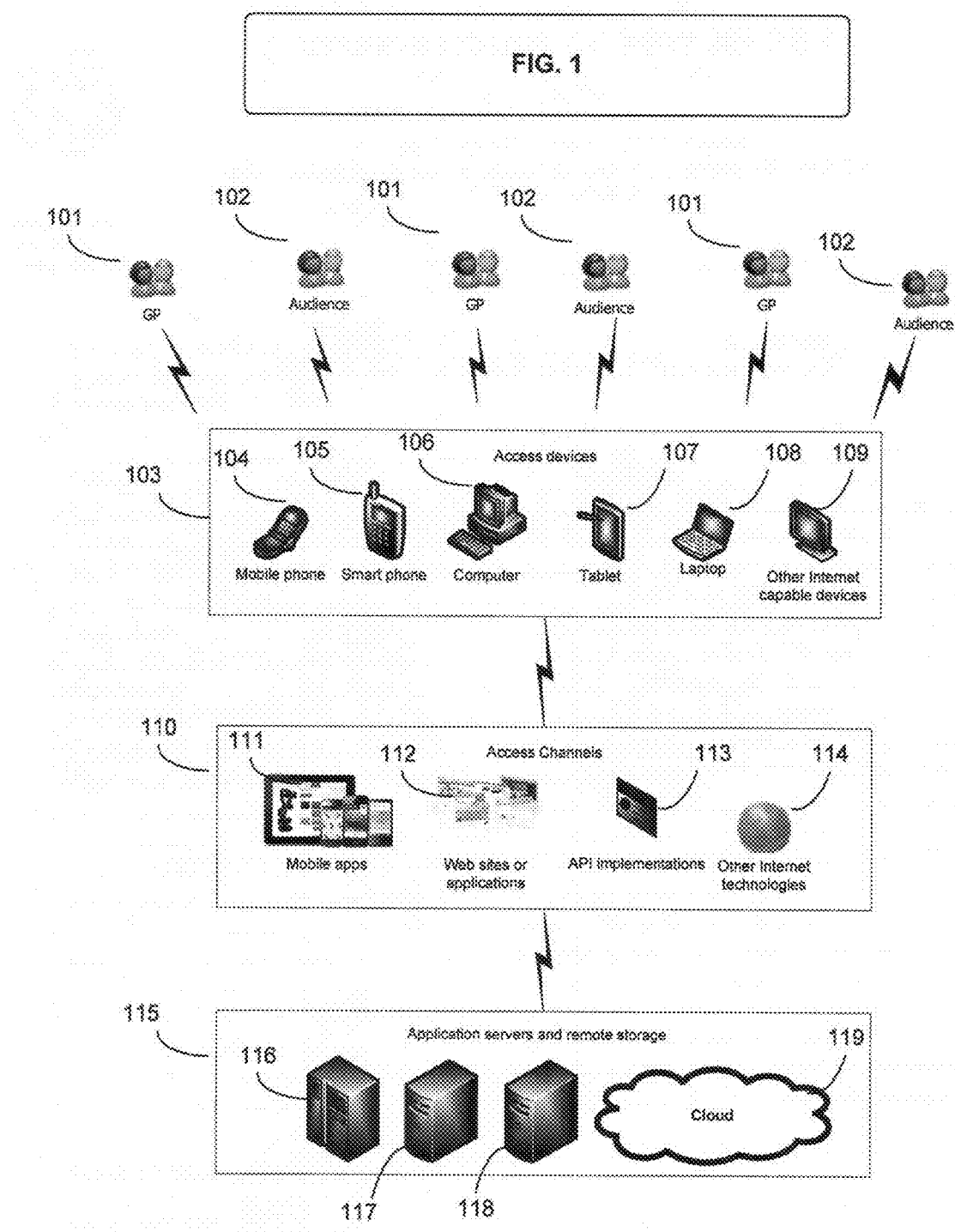

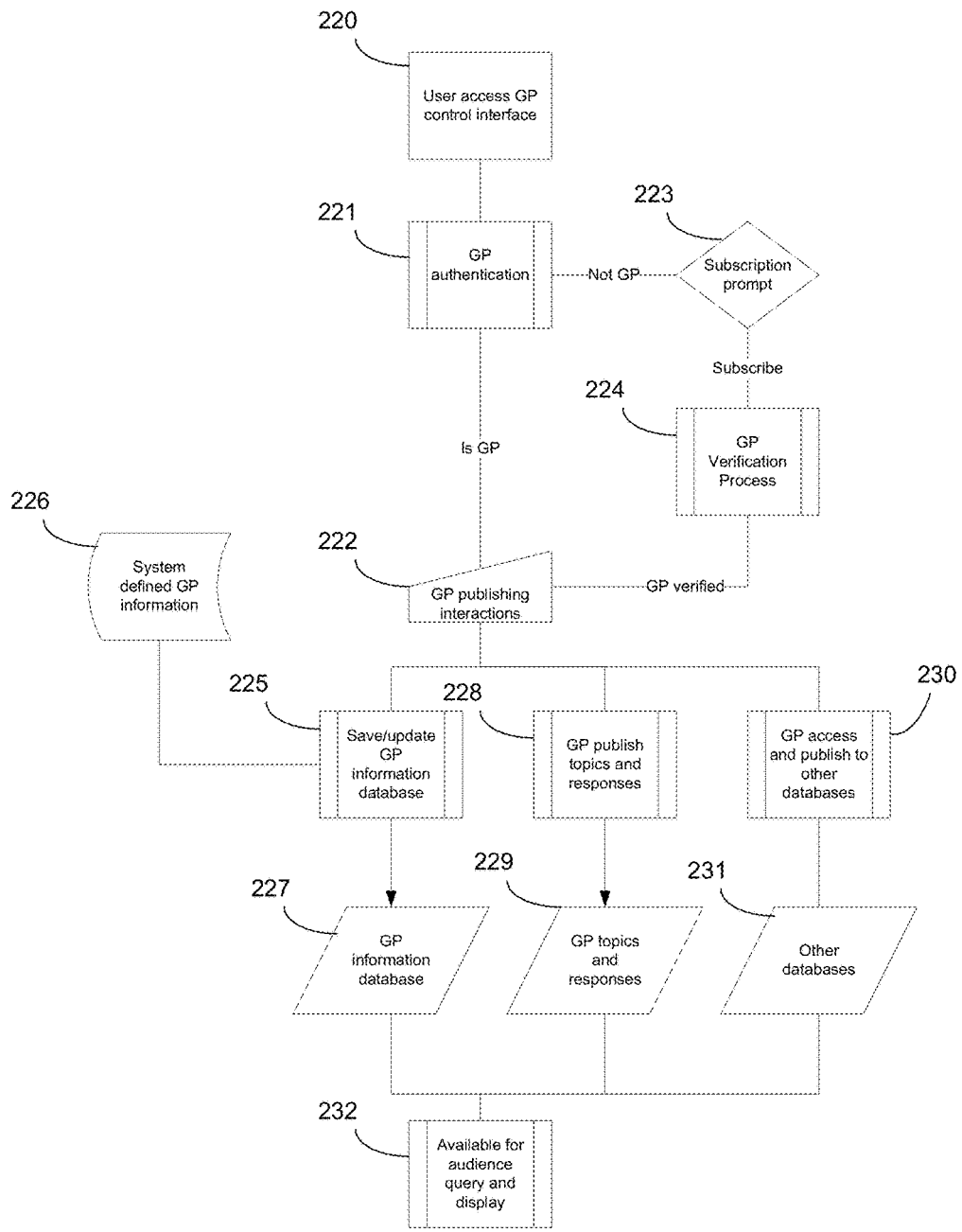

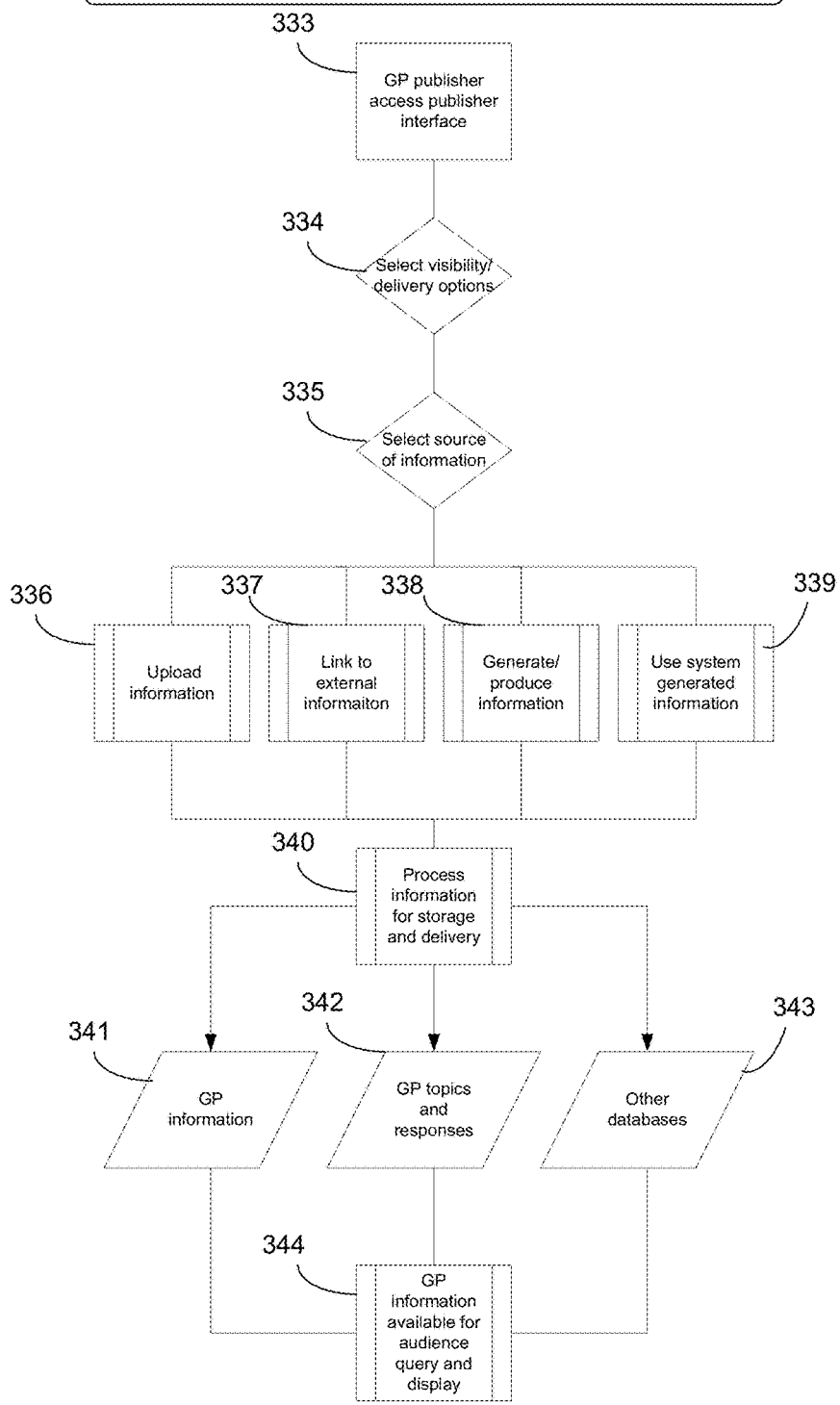

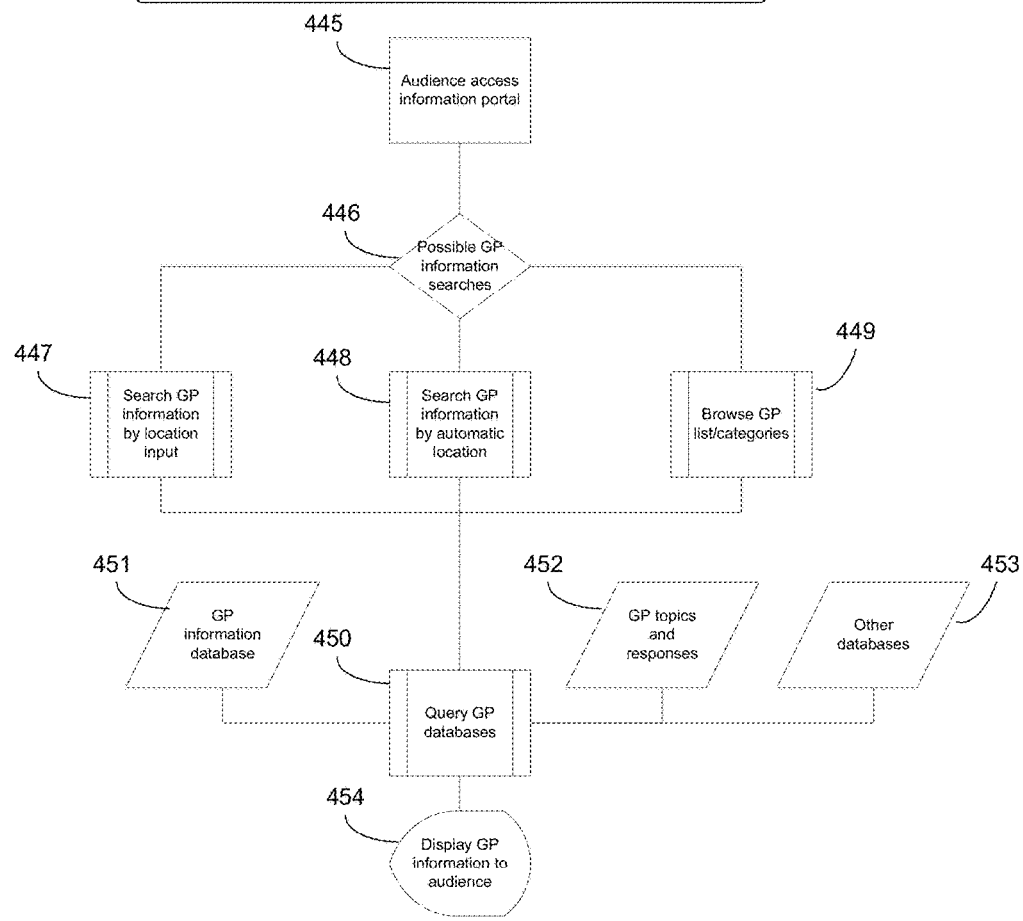

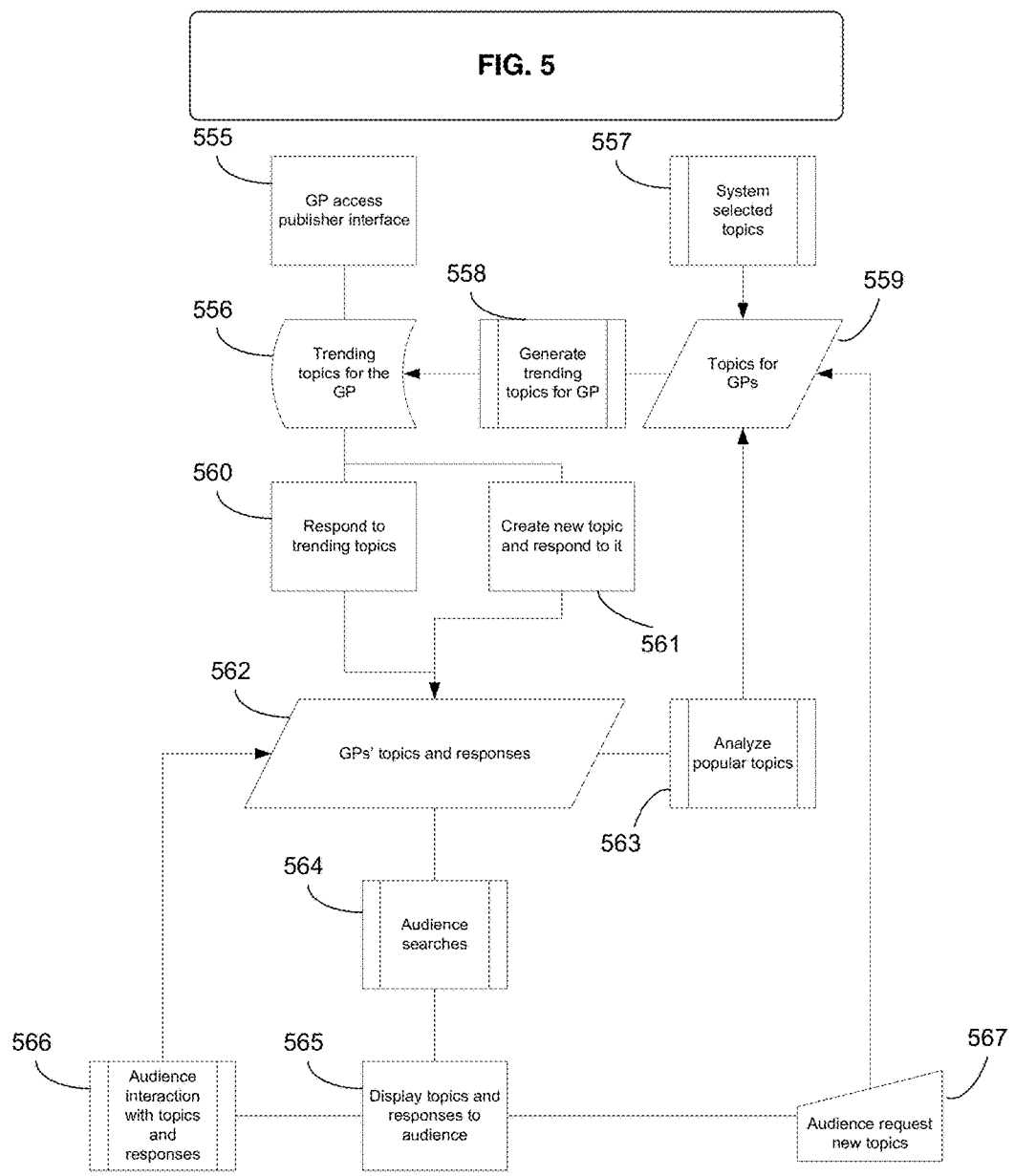

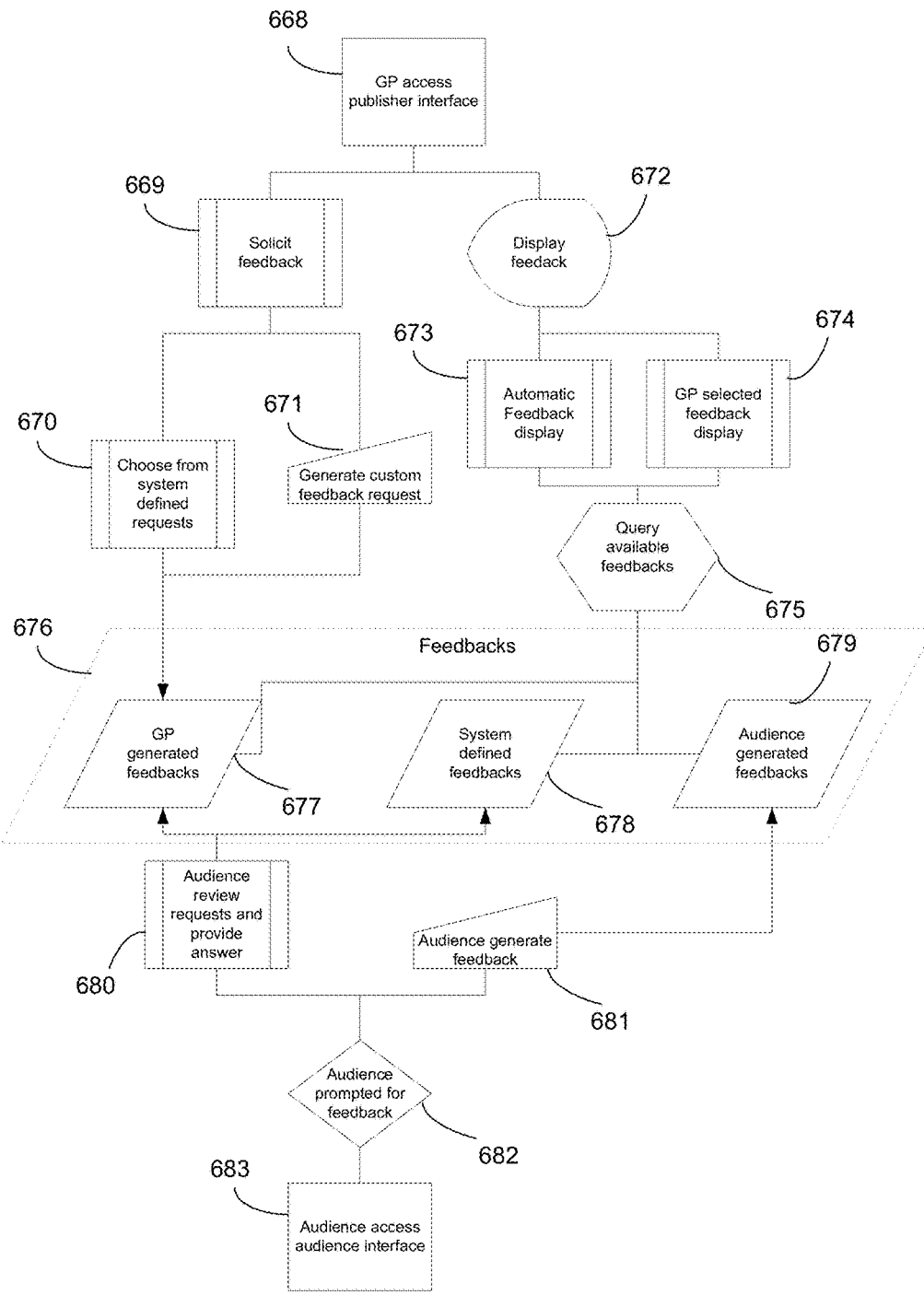

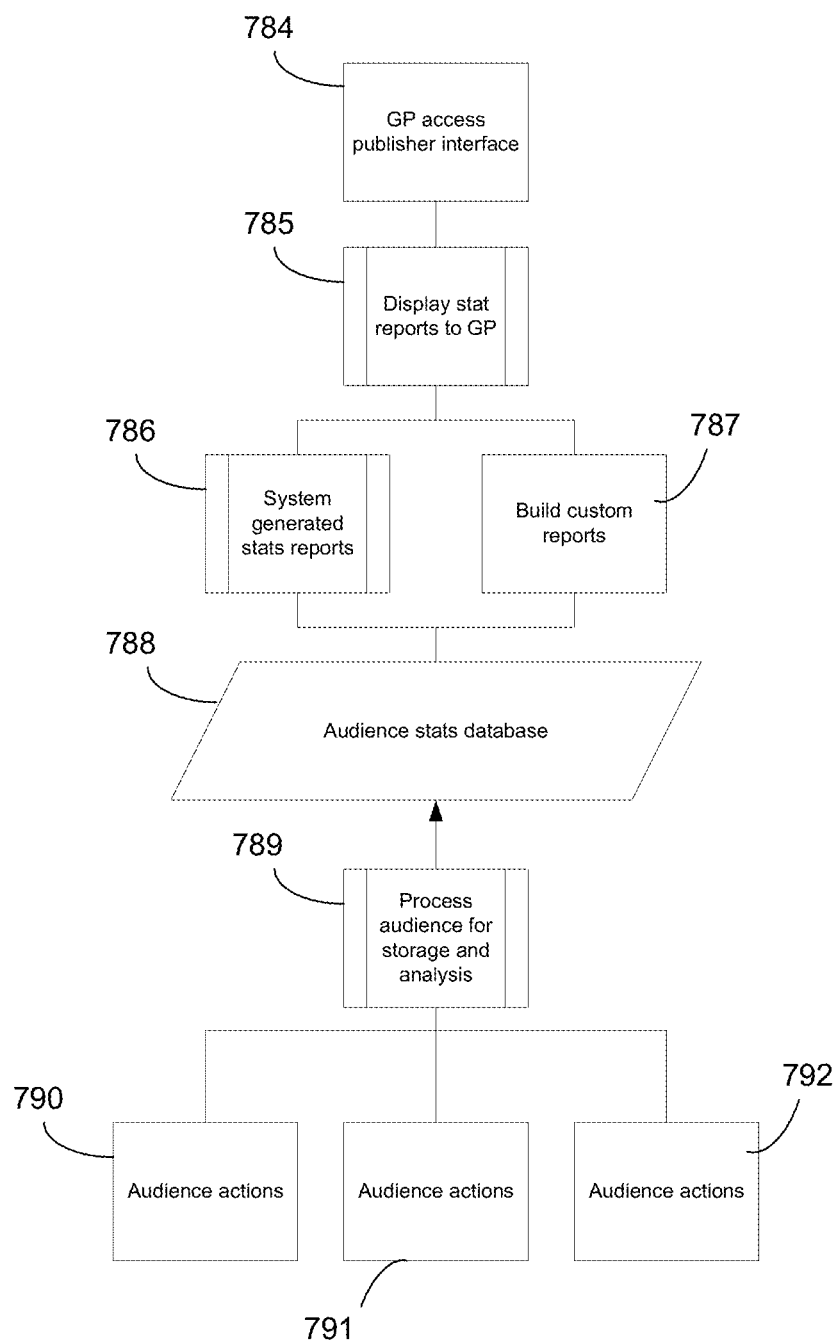

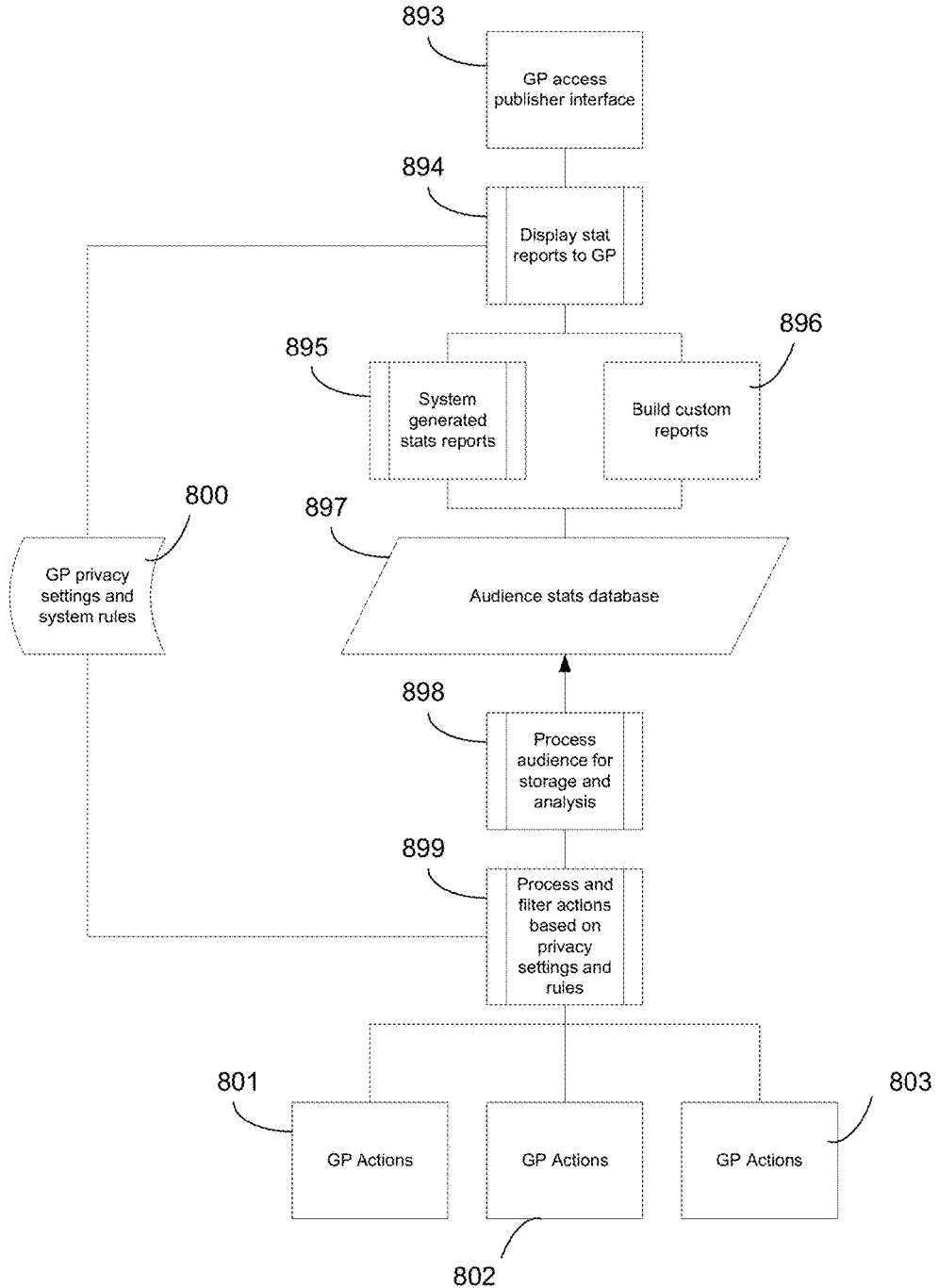

SYSTEM AND METHOD FOR MAKING AND MAINTAINING CONNECTIONS AND PROVIDING AND TRANSMITTING INFORMATION BETWEEN GOVERNMENTAL PERSONS OR CANDIDATES AND THE AUDIENCE

CROSS-REFERENCE TO RELATED APPLICATIONS

This disclosure claims priority from U.S. Provisional App. Ser. No. 61/756,163, entitled "METHOD FOR MAKING AND MAINTAINING CONNECTIONS AND PROVIDING AND TRANSMITTING INFORMATION BETWEEN GOVERNMENTAL PERSONS OR CANDIDATES AND THE AUDIENCE," filed Jan. 24, 2013, the entirety of which is incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This present invention relates to a system and method for making and maintaining connections and providing and transmitting information between governmental persons and candidates and the audience. More particularly, the present invention includes website, portal, interface, mobile app, software program that allows governmental persons and candidates to connect and communicate with users of the website, portal, interface, mobile app, or software program.

It is a challenge for governmental officials or persons holding elected office (along with candidates for the same offices, collectively "governmental persons" or "GP") to connect to their constituents and the public at large (collectively "Audience"). There is no central place for elected officials to post information to be consumed by the public. In today's digital age of the Internet and social media, there are many channels for governmental persons to publish information and broadcast messages. But most elected officials lack the resources to know all the channels that exist or to utilize all the channels even if the channels are known to them. Further complicating the matter, different channels require different technical knowledge and requirements. Governmental persons may not have the necessary personnel to perform the technical tasks in order to publish their information and broadcast their messages to those channels. Additionally, there is generally no reliable way to know if the recipients of the information or messages are indeed the same people that the governmental persons intended to reach. For example, if a state representative in Pennsylvania maintains a blog or Facebook page, but most of the visitors or viewers are from California, then the visitor stats may be misleading and vastly overestimating the effectiveness of the efforts to reach the senator's intended or targeted audience.

Governmental persons also cannot rely on the news media to get their message out. Many news stories are biased and do not accurately convey the governmental person's message. Yet others are reported out of context and only reflect the author's view of the governmental person's stance. It is even more difficult for candidates, especially at the state and local level.

It is also difficult for any member of the public to obtain information about persons they can cast votes for in any given election. Although there are places where the public can find information regarding the contenders, most sources of information only contain basic information and do not allow the public to thoroughly learn about the candidates (here and thereafter including incumbents and challengers). Those sources also usually do not allow the candidates themselves to choose what messages are published about them. Generally, candidates can only publish their messages through their own means (i.e. their own websites, Twitter, Facebook, LinkedIn, etc.).

When the election is over, after all the campaign ads are finished, it is even more difficult for the public to obtain up to date information about the persons they elected or other persons in office. This present invention aims to also serve as a portal that will connect the elected and lost candidates with the public between elections. The governmental persons can publish updates from the offices they hold and respond to hot topics. The lost candidate can keep in contact with the voting public by doing the same.

BRIEF SUMMARY OF THE INVENTION

The present invention aims to provide a convenient central place, system, or platform, with a dedicated purpose, for governmental persons to publish information and messages to their constituents, electorate, or public in general.

This present invention also aims to provide a central place, system, or platform, with a dedicated purpose, to allow all members of the public to easily and conveniently find out which candidates they can vote for and the information and messages the candidates wish to convey to the public (they can also find out about other candidates as well). The invention can further provide analysis and other information about the candidates. It will lower search cost for the public and provide useful information regarding governmental persons without the need to sort through endless useful information that clogs the web and social networks.

The present invention can further help governmental persons learn more about the voting public, devise a strategy for another run later, and help carry out that strategy ahead of future elections. The present invention aims to improve the communication between governmental persons and the public, persons, or parties they serve.

The present invention thus has multiple objectives. The principle objective is to provide a central place or system for governmental persons to maintain constant contact with the public. The governmental persons can publish a variety of information and messages for the public to consume. For example, they can publish text, articles, images, videos, audio, interactive modules, actions or interactions with other forms mentioned here, or other forms of media suitable for transmittal through the Internet, or a combination thereof. A further objective of the present invention is to provide a central place or system for the public to provide feedbacks to the governmental persons so they can learn more about the public and what's more important to them. The feedback can take the form of text, articles, images, videos, audio, interactive modules, actions or interactions with other forms mentioned here, or other forms of media suitable for transmittal through the Internet, or a combination thereof. A further objective of the present invention is to track data and information both by governmental persons and the public so the governmental persons can have meaningful analysis that can help them enact policy, make decisions, advocate for a position, succeed in future elections, or more.

BRIEF DESCRIPTION OF THE DRAWING

FIG. 1 is an illustration of an example implementation of a system that embodies the present invention.

FIG. 2 is a diagram showing an example of how a user to the system claiming to be a GP is verified.

FIG. 3 is a flowchart showing an example of how GP can publish information to the system and to the Audience.

FIG. 4 is a flowchart showing an example of how Audience can access information associated with a GP in the system.

FIG. 5 is a chart showing an example of how an example of a topics and responses system works.

FIG. 6 is a chart showing an example of how GP can view Audience information in the system.

FIG. 7 is a chart showing an example of how the system can gather and display Audience stats.

FIG. 8 is a chart showing an example of how the system can gather and display GP stats.

DETAILED DESCRIPTION OF THE INVENTION

The invention relates to a system and method for providing and transmitting information between governmental persons or candidates (GP) and the Audience.

GP include any person holding a governmental position or any person who obtains his or her position through the process of an election. Examples of GP include politicians, public officials, school board representatives, union officials, and other such persons. GP can also include an organization or other legal entities such as a group, political party, organizations, companies, unions, and other such entities. GP further includes candidates who include any persons or parties who are candidates for the above mentioned positions.

The Audience includes any persons or parties who utilize the invention to view information published by GP. Any member of Audience may utilize the invention as a member of GP, and any member of GP may utilize the invention as a member of Audience, provided that all conditions prescribed by the invention are met.

This invention can be implemented in different embodiments. ("System")

All aforementioned parties are users of the method or any embodiment. User of the invention can refer to a single user, any number of users, a group of users, or groups of users. Thus users can take both the role of Icons and Audience. The functionality of the system available to the user is dependent upon the role the user is assuming when using the system.

A GP must be verified by the System. A GP, after being verified as the person he or she claims to be, may subscribe to the system to gain certain functionalities as a subscriber.

This invention can be used by GP and Audience on any of a variety of devices, e.g., desktop computers, notebook computers, tablet computers, network terminals, mobile computers, smart phones, mobile phones, music or multimedia player devices, and more.

Information that can be transmitted through this invention include images, videos, messages, articles, releases, opinions, ideas, attributes, and any other information that can be transmitted through this method. The information can be transmitted between any and all parties, in all directions. The information can be transmitted through a variety of mediums, including the internet, extranet, intranet, wireless networks, cellular networks, local area networks, or any other public or private networks.

The infrastructure components of the invention that is used to facilitate the transmission, storage, and processing of the information can include a variety of servers, databases, systems, and more.

Referring to the figures, FIG. 1 is an illustration of an example implementation a system that embodies the present invention. Users of the system contained in FIG. 1 include GP 101 or Audience type 102 users. All users can access the system using access devices 103. Access devices 103 can include mobile phones 104, smart phones 105 (including iPhones, Android phones, smart phones running on other operating systems, and any future smart phone devices), computers 106 (including personal computers, desktop computers, all-in-one computers, workstations, or any other kind of computers), tablets 107 (including, iPads, Android tablets, tablets running other operating systems, and any future tablet computers), laptops 108 (including laptops, notebooks, mobile computers running any operating systems, and any other mobile computers), or other internet capable devices 109 (including television sets, internet access devices, DVD/Blue Ray players, Internet viewers, video game systems, or any other device that is capable of accessing the Internet). The information being transmitted by the system can be transmitted via a variety of channels 110 utilizing a variety of Internet technologies. The transmitting or access channels 110 can include mobile apps 111 on any platforms, web sites or applications 112 developed with any technology, API implementations 113 on any platforms, or any other Internet technologies 114 past, present, or future. The system itself can be located or housed on a number of backend technologies 115. The system can use web server 117, 118 or server systems or farms 116, or the system can be housed in the Cloud 119. The system can utilize a combination of appropriate web server technologies to run. The system and any other embodiments can also run in a distributed service form or as a SAAS. There are numerous implementation possibilities, FIG. 1 is intended to help understand the example system implementation, not to limit or define the invention.

FIG. 2 is a diagram of the process where a user to the system claiming to be a GP is verified. When a user access the GP control interface 220, the user will undergo an authentication process 221. If a user has registered GP credentials, the system will attempt to allow the user to log in. Only when a user has been authenticated as a GP, can the user be treated as a GP and be able to interact with the system to use its GP interactions or functionalities 222. GP interactions and functionalities can include the other processes described in FIG. 3-8 and more. If the user is not authenticated, or if the user was not a registered GP, the user will be given the chance to subscribe to the system 223—so the user can take on a GP role in the system. To subscribe, the user must undergo a verification process 224, where the system will ensure that the user is in fact a legitimate GP through a series of background checks. If verified, GP will be given options for subscription levels, which will determine the level of access/functionality the system will make available to the GP. The different levels can carry different prices or costs. Once GP is able to access GP publishing functionalities 222, GP will have the choices to perform a number of tasks. GP can input, save, update, or modify biographical and other information 225 to be saved in the GP information database 227. (Please note that the system would have already generated system-defined information 226 about the GP before the GP was verified. The goal is that the system has information or data about every possible GP in the country or in the world, even before they come to the system and be verified. Thus, even when a GP has not come forward to be verified as a GP in the system, the Audience can still obtain system-defined information about the GP 226.) GP can also publish topics and responses 228 to be saved in the topics and responses database 229. (The process will be further explained in FIG. 5.) GP can also access and publish 230 to other databases 231. The other databases 231 can include feedback database (example in FIG. 6), Audience stats database (example in FIG. 7), GP stats database (example in FIG. 8), and/or any other database being able store information. All the aforementioned databases (227, 229, 231) are all available for Audience query and display 232.

FIG. 3 is flowchart showing how GP can publish to the system and to the Audience. Once authenticated, GP starts by accessing the GP publisher interface 333. GP has the chance to select and define a number of visibility, privacy, delivery, and other options 334. GP will select a source for the information to be published 335. GP can upload information 336; GP can link to external information 337 (such as web pages, websites, blogs, posts, articles, photos, videos, audio files, and more); GP can generate, produce, or input information 338 using a variety of formats; GP can also choose from system generated information 339 made available to them by the system. System generated information 339 can include uploaded, external, system generated, produced, or inputted information. After the information source is set, the system will process the designated information for storage and delivery 340. The designated information can be saved in a variety of databases, including GP information database 341, topics and responses database 342, and other database 343. Once saved, the designated information can then be available for Audience query and display 344.

FIG. 4 is a flowchart showing how Audience can access the information in the system. Audience can be authenticated or not. The system can allow more functionality and options to authenticated users. GP can also determine if authenticated users can have more options and functionalities when it comes to the GP's information in the system. Authentication means that Audience registered with the system by providing certain personal information and received credentials to log in and out of the system. The authentication process will be defined by the system and can employ a number of ways to register and authenticate the users. When Audience access the system's information portal for Audience users 445, a number of possible options to search for GP information are presented to Audience 446. If the Audience is a registered and authenticated user of the system, the system may present some preset or saved searches to the Audience so they do not have to repeat the searches and can view the GP information faster. Even in such a case, Audience can still search for GP information 446 using all available options. Three examples of search for GP information is presented here, although other ways to search or filter. GP information can be incorporated as well. Audience can search GP information based on manual location input 447. Audience can manually input their current locations or any other location by using address, zip, telephone number, etc. either individually or in any combinations. Audience can also search GP information based on their current location 448, as automatically determined by their device, their ISP, the system, or any other means of determining their current location. Audience can also search for GP information by browsing or searching through a list of GPs, jurisdictions, offices, positions, either individually or in any combination. With search criteria determined, the system will query GP information database 450 and provide the appropriate GP information to display to Audience 454. As previously mentioned, the GP databases can include general GP information database 451, topics and responses 452, and any other databases 453.

FIG. 5 is a chart showing how an example of a topics and responses system works. After being authenticated, GP can access the publisher interface 555. To provide address or respond to a topic, GP review and select from trending topics 556. The trending topics 556 can be presented and sorted by popularity 558 or be presented and sorted in any other order defined by GP or the system. GP can respond to any of the trending topics directly 560 using any of the methods or functions available to publish information (such as explained in FIG. 3). GP can also create a new topic and respond to it 561 if the list of trending topics does not include GP's desired topic. After GP designate information for publishing in respond to any of the topics (existing or new), the information will be saved in the GPs' topics and responses database 562. The topics and responses database is available for searches by Audience 564, for example using the methods described in FIG. 4. The search results can be displayed to Audience 565. Audience can perform interactions and provide information to topics and responses 566, and the information provided by Audience can be saved in the topics and responses database 562. The type of interactions can include, for example, "likes," votes, comments, recommends, forwards/referrals, and more. These interactions should be governed by GP-generated, Audience-generated, and system generated privacy, visibility, and other delivery rules.

Again referring to FIG. 5, the trending topics presented to GP 556 are generated as follows: the system will analyze the topics and responses database 563, either periodically, dynamically, or on-demand, and generate a list of topics available to GP to respond to 559. The system will define the parameter and algorithm of the analysis. The system may provide system-generated topics 557 to be added to the topics available to GP 559. Additionally, Audience can request new topics 567 to be added to the topics available to GP 559. The available topics 559 then can be analyzed based on system-defined criteria or GP-defined criteria 558 to arrive at the trending topics list for GP to review 556.

FIG. 6 is a chart showing how Audience can provide feedback to GP. Feedback can be in many forms, for example, including polls, surveys, votes, comments, and more. After being authenticated, GP access publisher interface 668. GP can solicit a certain type of feedback 669. The feedback can be accompanied by other published information, such as GP information such as described in FIG. 3, and topics and responses as described in FIG. 5. GP can choose from system defined feedback requests 670 or generate custom feedback requests 671. Feedback requests can be stored in one database 676 or individual databases separating different requests types such as GP generated 677, system defined 678, and Audience generated 679. The overall feedback database 676 can encompass all three types mentioned above. The GP generated feedback requests can be saved in GP generated feedback database 677. System generated requests can be stored in system defined feedbacks database 678. Audience generated feedbacks can be saved in Audience generated feedbacks database 679. When Audience access the Audience interface or information portal 683, Audience can be prompted to provide feedback 682. Audience can be prompted by a list of feedback requests available to the specific Audience 680, as determined by querying the feedback databases 676 (including 677, 678, 679). When Audience provides the requested feedback 680, the response is recorded in feedback database 676. Audience can also provide feedback if no requests match Audience's desire, in which Audience will generate their own requests and feedback 681. The response then is recorded in the feedback database 676 (or 679 if separately organized). For GP's viewing, the system will query the feedback database 675 to determine the available requests and responses to be displayed to GP. Feedback can be automatically selected for display 673 based on system defined parameters or criteria, or can be selected for display based on GP determined parameters, criteria, or searches 674. The resulting feedback requests and responses are then displayed to GP 672.

FIG. 7 is a chart showing a process on how to gather and display Audience stats. After being authenticated, GP access the publisher interface 784. GP has the option to view stats reports 785. The reports available to be seen can include system generated stats reports based on the specific GP's jurisdiction or other criteria 786. GP can also have the option to build custom reports based on a number of factors 787. The stats data will be housed in an Audience stats database 788. When Audience interacts with the system, their interactions generate data that can be tracked 790, 791, 792. All kind of interactions can be tracked. For example, viewing GP data, searching GP data, providing feedbacks, reviewing topics and responses, etc are actions that can be tracked. All the Audience interaction data will be processed for storage and analysis 89 and then stored in the audience stats database 788.

FIG. 8 is a chart showing a process on how to gather and display GP stats. After being authenticated, GP access the publisher interface 893. GP has the option to view stats reports 894. The reports available to be seen can include system generated stats reports based on the specific GP's jurisdiction or other criteria 895. GP can also have the option to build custom reports based on a number of factors 896. The stats data will be housed in a GP stats database 897. The stats database can be separate from or the same as the Audience stats database 788. When GP interact with the system, their interactions generate data that can be tracked 801, 802, 803. All kind of interactions can be tracked. For example, publishing GP information, generating and responding to topics, soliciting feedbacks, etc. All the GP interaction data will first be process and filtered 899 based on privacy settings and rules 800. The privacy settings and rules 800 can be set by the GP after GP access the publisher interface 893 and can also be based on system defined rules and policies. After the privacy filtering 899, the interaction data can then be processed for storage and analysis 898 and then stored in the audience stats database 897.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A system for transmitting information associated with a group of governmental persons and a group of audience users, comprising:
   a processor connected to a network;
   a database connected to said processor containing at least one government person account and one audience user account;
   a governmental person user interface operable to interact with said processor and said database;
   a separate audience person user interface operable to interact with said processor and said database;
   wherein said processor is configured to
      receive a verification request from said governmental person user interface,
         search stored information associated with said governmental person stored in said database, wherein if said stored information contains a match for information contained in said verification request the verification is successfully complete, and
      upon the completion of said verification create a governmental person account in said database;
      request, from at least one third party source, first information associated with said at least one governmental person,
      receive said first information,
      process said first information by categorizing or indexing based on keywords or other criteria, received from said governmental person user interface, or retrieved from said at least one governmental person's governmental person account stored in said database, and
      store said processed first information in said database;
      receive second information associated with said at least one government person from said governmental person user interface,
      process said second information by categorizing or indexing based on keywords or other criteria, received from said governmental person user interface, or retrieved from said at least one governmental person's governmental person account stored in said database, and
      store said processed second information in said database;
      receive information associated with at least one audience user,
      receive information associated with at least one audience user,
      process said audience user information by categorizing or indexing based on keywords or other criteria thus making said audience user information searchable by said keywords or other criteria, and
      store said processed audience user information in said database;
      receive a first search request from said audience person user interface wherein said first search request contains keywords or other search criteria,
      search said first or second information stored in said database based on said first search request and the keywords or other search criteria contained within, defined by the system or retrieved from said governmental person account stored in said database,
      generate a first search result, and
      cause said audience user interface to display said first search result.

2. The system of claim 1, wherein said processor is configured to receive a modification request from said governmental person user interface to modify said keywords or other criteria with which said processor uses to perform said first search request;
modify said keywords or other criteria based said modification request; and
store said modified keywords or other criteria in said governmental person account associated with said governmental user in said database.

3. The system of claim 1, wherein said processor is configured to
determine whether said at least one governmental person is associated with an existing said governmental person account in said database
upon the determination that said association exists
modify said first or second information associated with said at least one said governmental person stored in said database by categorizing or indexing based on keywords or other criteria defined by the system, received from said governmental person user interface, or retrieved from said governmental person account stored in said database, thus making said modified first or second information searchable by said keywords or other criteria, and
store said modified processed first or second information in said database.

4. The system of claim 1, wherein said processor is configured to
receive a modification request from said governmental person user interface to modify said keywords or other criteria said processor uses to process said first or second information associated with said at least one governmental person;
modify said keywords or other criteria based on said modification request;
store said modified keywords or other criteria in said governmental person account associated with said at least one governmental person in said database;
causes said processor to process said first or second information by categorizing or indexing based on said modified keywords or other criteria, thus making said modified first or second information searchable by said modified keywords or other criteria; and
store said modified processed first or second information in said database.

5. The system of claim 1, wherein said processor is configured to receive a second search request from said governmental person user interface wherein a third information associated with at least one audience user is requested;
search said audience user information stored in said database based on said second search request and the keywords or other search criteria contained within;
generate a second search result based on said audience user information in said database; and
cause said governmental person user interface to display said second search result.

6. The system of claim 1, wherein said processor is configured to
receive a modification request from said governmental person user interface to modify said keywords or other criteria said processor uses to process said audience user information;
modify said keywords or other criteria based on said modification request;
store said modified keywords or other criteria in said governmental person account associate with said at least one governmental person in said database;
cause said processor to process said audience user information by categorizing or indexing based on said modified keywords or other criteria, thus making said modified processed audience user information searchable by said keywords or other criteria; and
store said modified processed audience user information in said database.

7. The system of claim 1, wherein said processor is configured to perform analysis on said first information stored in said database and generate a report based on said analysis;
store said report in said database; and
cause at least one of said governmental person user interface and said audience user interface to display said report.

8. The system of claim 1, wherein said processor is configured to
perform analysis on said second information stored in said database and generate a report based on said analysis;
store said report in said database; and
cause at least one of said governmental person user interface and said audience user interface to display said report.

9. A method of transmitting information associated with a group of governmental persons and a group of audience persons executable on a computer or processor connected to a network, comprising:
receiving a verification request from said governmental person user interface,
comparing information contained in said verification request with stored information associated with said governmental person stored in said database wherein if said information contained in said verification request matches said stored information the verification is successfully complete;
and upon the completion of said verification creating a governmental person account in said database;
requesting, from at least one third party source, first information associated with at least one governmental person,
receiving said first information,
processing said first information by categorizing or indexing based on keywords or other criteria defined by the computer or processor, received from a governmental person user interface, or retrieved from said at least one governmental person's governmental person account stored in a database connected to said computer or processor, and
storing said processed first information in said database;
receiving second information associated with said at least one government person from said governmental person user interface,
processing said second information by categorizing or indexing based on keywords or other criteria defined by said computer or processor, received from said governmental person user interface, or retrieved from said at least one governmental person's governmental person account stored in said database, and
storing said processed second information in said database;
receiving information associated with at least one audience user, processing said audience user information by categorizing or indexing based on keywords or other criteria thus making said audience user information searchable by said keywords or other criteria, and storing said processed audience user information in said database;

receiving a first search request from at least one audience person user interface wherein said first search request contains keywords or other search criteria, searching available said first or second information stored in said database based on said first search request and the keywords or other search criteria contained within, defined by the system or retrieved from said governmental person account stored in said database, generating a first search result, and causing said audience user interface to display said first search result.

10. The method of claim 9, further comprising:
receiving a modification request from said governmental person user interface to modify said words or other criteria with which said processor uses to perform said first search request;

modifying said keywords or other criteria based said modification request; and storing said modified keywords or other criteria in said governmental person account associated with said governmental user in said database.

11. The method of claim 9, further comprising:
determining whether said at least one governmental person is associated with an existing said governmental person account in said database;

upon the determination that said association exists
modifying said first or second information associated with said at least one said governmental person stored in said database by categorizing or indexing based on keywords or other criteria, received from said governmental person user interface, or retrieved from said governmental person account stored in said database, thus making said modified first or second information searchable by said keywords or other criteria, and storing said modified processed first or second information in said database.

12. The method of claim 9, further comprising:
receiving a modification request from said governmental person user interface to modify said keywords or other criteria said processor uses to process said first or second information associated with said at least one governmental person;

modifying said keywords or other criteria based on said modification request;

storing said modified keywords or other criteria in said governmental person account associated with said at least one governmental person in said database;

causing said processor to process said first or second information by categorizing or indexing based on said modified keywords or other criteria, thus making said modified first or second information searchable by said modified keywords or other criteria; and storing said modified processed first or second information in said database.

13. The method of claim 9, further comprising:
receiving a second search request from said governmental person user interface wherein a third information associated with at least one audience user is requested;

searching said audience user information stored in said database based on said second search request and the keywords or other search criteria contained within;

generating a second search result based on said audience user information in said database; and causing said governmental person user interface to display said second search result.

14. The method of claim 9, further comprising:
receiving a modification request from said governmental person user interface to modify said keywords or other criteria said processor uses to process said audience user information;

modifying said keywords or other criteria based on said modification request;

storing said modified keywords or other criteria in said governmental person account associate with said at least one governmental person in said database;

causes said processor to process said audience user information by categorizing or indexing based on said modified keywords or other criteria, thus making said modified processed audience user information searchable by said modified keywords or other criteria; and store said modified processed audience user information in said database.

15. The method of claim 9, further comprising:
performing analysis on said first information and generating a report based on said analysis;

storing said report; and displaying said report.

16. The method of claim 9, further comprising:
performing analysis on said second information and generating a report based on said analysis;

storing said report; and displaying said report.

* * * * *